United States Patent [19]
Jones

[11] 3,868,415
[45] Feb. 25, 1975

[54] PREPARATION OF 5-FLUORO-2-METHYL-1-(P-METHYL-SULFINYLBENZYLIDENE)-INDENYL-3-ACETIC ACID

[75] Inventor: Howard Jones, Holmdel, N.J.

[73] Assignee: Merck & Co., Inc., Rahway, N.J.

[22] Filed: Oct. 3, 1973

[21] Appl. No.: 402,941

[52] U.S. Cl............. 260/515 A, 260/469, 260/470, 260/475 F, 260/475 SC, 260/590
[51] Int. Cl.......................................... C07c 147/00
[58] Field of Search........................ 260/470, 515 A

[56] References Cited
UNITED STATES PATENTS
3,312,730  4/1967  Winter................................ 260/473

Primary Examiner—James A. Patten
Attorney, Agent, or Firm—Mario A. Monaco; Harry E. Westlake, Jr.

[57] ABSTRACT

Process for the preparation of 5-fluoro-2-methyl-1-(p-methylsulfinylbenzylidene)-indenyl-3-acetic acid, by reacting 5-fluoro-2-methyl-indane-1,3-dione under Stobbe conditions, decarboxylation, esterification and subsequent reaction with a methylsulfinylbenzyl compound followed by hydrolysis.

4 Claims, No Drawings

PREPARATION OF 5-FLUORO-2-METHYL-1-(P-METHYL-SULFINYLBENZYLIDENE)-INDENYL-3-ACETIC ACID

This invention is directed to the preparation of 5-fluoro-2-methyl-1-(p-methylsulfinylbenzylidene)-3-indenyl acetic acid.

BACKGROUND OF THE INVENTION

The above mentioned 3-indenyl acetic acid is a known compound having anti-inflammatory activity as described in U.S. Pat. No. 3,654,349. In the past, this compound has been prepared by condensing an appropriate substituted benzaldehyde with an acetic acid ester in a Claisen Reaction or with an α-halogenated propionic acid ester in a Reformatsky Reaction. The resulting unsaturated ester was reduced and hydrolyzed to give a β-aryl propionic acid which was ring closed to form the indanone. The aliphatic acid side chain was then introduced by a Reformatsky or Wittig Reaction and the 1-substituent was introduced into the resultant indenyl acetic acid or ester by reacting said acetic acid derivative with an aromatic aldehyde or ketone of the desired structural formula and dehydrating to form the desired indenyl acetic acid.

It is an object of this invention to provide a new process for preparing 5-fluoro-2-methyl-1-(p-methylsulfinyl-benzylidene)-3-indenyl acetic acid.

DETAILS OF THE INVENTION

In accordance with this invention, it has been found that the subject compound can be readily prepared by the novel combination of several chemical reaction steps. Accordingly, 5-fluoro-2-methyl-indane-1,3-dione is reacted under Stobbe conditions to form the corresponding arylidene malonic acid diester, which is subsequently decarbethoxylated and esterified to form a 5-fluoro-2-methyl-ind-2-eneind-2-ene-1-one-3-acetate which compound, in turn, is converted to the desired compound by the nucleophillic addition of a p-methylsulfinylbenzyl compound to the carbonyl of the 5-fluoro-2-methyl-ind-2-ene-1-one-3-acetate ester and subsequent hydrolysis of the ester.

More specifically, a malonic acid ester is first reacted in the presence of a strong base with 5-fluoro-2-methyl-indane-1,3-dione to form the corresponding arylidene malonic acid diester. The ester moiety of the malonic acid is not critical and may suitably be any alkyl, aryl or ar-alkyl ester such as $C_{1-5}$ alkyl (methyl, ethyl, propyl or t-butyl), phenyl or substituted phenyl, phenyl $C_{1-5}$ alkyl) such as benzyl, phenethyl, and the like or substituted phenyl ($C_{1-5}$ alkyl). Preferably, the ester is the $C_{1-5}$ alkyl ester and especially methyl. The reaction with the malonate ester may be carried out with or without a solvent. If a solvent is desired, any solvent such as benzene, ether, tetrahydrofuran, liquid ammonia (for sodamine), or t-butanol (for potassium t-butoxide) may be employed. The base employed may be any strong base such as alkali metal or alkali earth alkoxides, alkali hydroxides, sodamide, sodium hydride, potassium t-butoxide, or sodium metal, and preferably an alkali $C_{1-5}$ alkoxide such as potassium t-butoxide, sodium ethoxide or sodium methoxide. The reaction may be carried out at a temperature of from −80° to 100°C and especially 60° to 80°C. The concentration of the reactants and strong base is not critical and, therefore, any suitable concentration may be used, such as from 1.0 to 2.0 mole of ester to dione, especially 1.0 to 1.5 mole, and 1.0 to 5.0 mole of base to ester, especially 1.0 1.1 mole. The arylidene compound thus formed is decarboxylated by means well known in the art such as by heating said compound in the presence of an organic acid or mineral acid such as aqueous p-toluene sulfonic acid, concentrated hydrochloric acid, hydrobromic acid or phosphoric acid. Any inert solvent may be used in this reaction such as benzene, toluene or xylene. However, it is preferred to carry out the reaction in the presence of an aqueous mineral acid such as hydrochloric acid using it both as the solvent and acid reactant as well. The concentration of the acid employed is not critical and accordingly it is preferred to add sufficient acid to acidify the reaction mixture. The reaction is suitably carried out at or near the reflux temperature of the system until substantial decarboxylation has taken place (i.e., evolution of $CO_2$ has stopped). The 5-fluoro-2-methyl-ind-2-ene-1-one-3-acetic acid thus formed is esterified under well known conditions to form the corresponding ester.

Since the ester is merely a protective group and hydrolyzed off in the last step of the invention to form the desired acid compound, the ester may be any organic ester forming group such as alkyl, preferably of from 1–6 carbon atoms, (methyl, ethyl, butyl), ar-alkyl such as phenyl-alkyl of from 7–12 atoms (i.e., benzyl, phenethyl), aryl such as phenyl. Preferably, the ester is derived from an alkanol of from 1–6 carbon atoms and especially methyl or benzyl alcohol. The esterification may be readily carried out by reacting the 3-acetic acid compound with an appropriate alcohol preferably a $C_{1-5}$ alkanol such as methanol or ethanol in the presence of a strong organic acid or inorganic acid such as conc. sulfuric acid, gaseous hydrogen chloride, or p-toluenesulfonic acid.

The molar concentration of alcohol to 3-acetic acid compound is not critical and is normally in the range of 10 to 100 moles of alcohol to one mole of 3-acetic acid compound. The reaction is normally carried out at elevated temperatures until substantial esterification has taken place, for example, from 60° to 150°C, either in the presence of an inert solvent such as dioxane, diglyme, or preferably using the alcohol as solvent as well as reactant.

The next step, the nucleophillic addition of the p-methylsulfinylbenzyl compound, can be readily carried out by either the Grignard Reaction or the Wittig Reaction. In the case of the Grignard Reaction, the ester of 5-fluoro-2-methyl-ind-2-ene-1-one-3-acetate is, for example, reacted with a Grignard reagent prepared by reacting a p-methylsulfinylbenzyl halide (i.e., chloride or bromide) and magnesium at a temperature of from 0° to 10°C for a period of time from 1 to 24 hours, but preferably at a temperature of from 0° to 5°C for 8 to 10 hours. This reaction can be carried out in the presence of an inert solvent such as ether, tetrahydrofuran or dioxane. The Grignard reagent may, if desired, then be isolated by techniques well known to the art, subsequently reacted with the acetate compound in the presence of an inert solvent such as ether, tetrahydrofuran or dioxane, at a temperature of 10° to 20°C for a period of 6 to 12 hours, and then dehydrated using a dehydrating agent such as phosphorous pentoxide, phosphorous pentachloride, p-toluenesulfonic acid or polyphosphoric acid at 40° to 100°C. Preferably, however, the reaction between the Grignard reagent and acetate compound is carried out in the presence of an inert solvent such as ether or tetrahydrofuran, at a temperature of 0° to 20°C for a period of 1 to 12 hours and then dehydrated using phosphorous pentoxide, phosphorous pentachloride, polyphosphoric acid or p-toluenesulfonic acid at 40° to 100°C in benzene. Alternatively, the nucleophillic addition may be carried out by the well known Wittig Reaction. For example, the reaction may be carried out by the reaction of the appropriate alkylidenephosphorane with a 5-fluoro-2-methyl-ind-2-ene-1-one-3-acetate. More specifically, the reaction may be carried out by reacting the 5-fluoro-2-methyl-ind-2-ene-1-one-3-acetate with p-methylsulfinylbenzylidenetriphenylphosphorane in the presence of an inert solvent such as ether, tetrahydrofuran or dioxane for a period of time of from 1 to 12 hours. Concentration of reactants is not critical and, accordingly, one may use from 1.1 to 2 moles of Wittig reagent to one mole of indenone. The thus prepared ester of 5-fluoro-2-methyl-1-(p-methylsulfinylbenzylidene)-indenyl-3-acetate is then hydrolyzed. The hydrolysis may be carried out using acids or bases under conditions well known to the art for hydrolysis of an ester. Such acids as dilute hydrochloric or sulfuric acid at temperatures of from 0° to 120°C may be used as well as organic or inorganic bases such as aqueous or aqueous alcoholic alkali or alkali earth hydroxides, pyridines, alkali or alkali earth carbonate or bicarbonate or morpholine; such as calcium hydroxide, sodium hydroxide, calcium carbonate, sodium carbonate, sodium bicarbonate and the like, but preferably alkali hydroxide (sodium hydroxide, potassium hydroxide) at temperatures of from 0° to 120°C and preferably from 50° to 80°C. Similarly, the concentration of reactants is not critical, however for the sake of higher yields, one would preferably use between 2 to 6 moles of base or acid to one mole of acetate compound. The reaction may be carried out in a variety of inert solvents, preferably under aqueous or aqueous alcoholic conditions such as aqueous sodium carbonate, sodium hydroxide or mixtures of water and organic bases such as aqueous pyridine or morpholine. The time of reaction is not critical and the reaction is preferably carried out until essentially complete hydrolysis takes place which usually occurs between 1 to 4 hours.

The starting material for this invention; namely, the 5-fluoro-2-methyl-indane-1,3-dione can be prepared by hydrogenating nitrophthalic acid to 4-aminophthalic acid in the presence of platinum on carbon, zinc and acetic acid or iron and hydrochloric acid in the presence of an inert solvent such as ethyl acetate, methanol or ethanol at a temperature of from 20° to 60°C, preferably at or about room temperature under pressures of from 1 to 30 atmos but especially 1 to 2 atmos until the required amount of hydrogen is taken up. The 4-aminophthalic acid is then converted to the 4-fluorophthalic acid by well known means for converting an amino group to a fluoro group. For example, the reaction may be carried out by dissolving the 4-aminophthalic acid in fluoroboric acid at temperatures of from 0° to 10°C and subsequently adding sodium nitrite to diazotize the amine, raising the temperature to decompose the diazonium salt and cause the formation of the 4-fluorophthalic acid. This latter compound is then converted to its corresponding diester such as the $C_{1-5}$ dialkyl ester (i.e., diethyl ester) by means well known to the art. For example, the 4-fluorophthalic acid may be reacted in the presence of ethanol in a small quantity of concentrated sulfuric acid and refluxed for a sufficient period of time to form the appropriate diester. The 4-fluorophthalic diester thus formed is then readily converted to its corresponding 5-fluoro-2-methyl-indanone-1,3-dione by admixing the diester with methanol and sodium and then slowly added to a $C_{1-5}$ alkyl ester of propionic acid such as ethylpropionate and the solution refluxed for a period of time such as from 2–6 hours to form the desired dione.

The following examples are given by way of illustration.

EXAMPLE 1

A. 4-Aminophthalic acid

4-Nitrophthalic acid (0.2 mole) [Gaz. Anin. et al 329–341 87 (1959)] is hydrogenated over 10 percent Pd/C in ethyl acetate (1 l.) at room temperature and 42 p.s.i. until the theoretical uptake of 2 moles of hydrogen have been taken up. The catalyst is filtered off and the solvent evaporated down to dryness to give 4-aminophthalic acid.

B. 4-Fluorophthalic acid

4-Aminophthalic acid (0.2 mole) is dissolved in 200 ml. of 48 percent fluoroboric acid and cooled to 0°–5° in an ice-ethanol bath. Keeping the temperature below 10°C the amine is diazotized by adding a solution 14.7 g. (0.21 mole) of sodium nitrite in small portions with stirring. The solution is allowed to stand at 10° for 1 hour and then warmed to room temperature to decompose the diazonium salt. After the evolution of nitrogen has ceased the solution is extracted into ethyl acetate (3 × 200 ml.) and dried ($MgSO_4$). The solution is filtered, evaporated and the acid recrystallized from alcohol.

C. Diethyl 4-fluorophthalate

The acid above (0.2 mole) in ethanol (200 ml.) and 0.5 ml. concentrated sulfuric acid is refluxed for 3 hours and evaporated to 1/10 volume. The organics are taken up in ether (200 ml.) and the ether solution is washed well with saturated sodium bicarbonate solution (3 × 100 ml.), water (100 ml.), separated and dried ($MgSO_4$). The organic solution after filtration is evaporated to dryness to give the subject compound as a liquid.

D. 5-Fluoro-2-methylindane-1,3-dione

To a mixture of the diethyl ester above (0.2 mole) and metallic sodium (0.4 mole) is added slowly, with cooling and stirring, ethyl propionate (0.4 mole). The solution is then refluxed for 4 hours and washed with 500 ml. of ether. The precipitated solid is filtered, dissolved in water (300 ml.), washed with ether (100 ml.) and the aqueous layer acidified with sulfuric acid until the evolution of carbon dioxide ceases. The mixture is extracted into $CH_2Cl_2$ (3 × 200 ml.), the $CH_2Cl_2$ solution washed with water (2 × 100 ml.), dried ($MgSO_4$), filtered and evaporated to dryness to give an oil which crystallizes on cooling.

E. Methyl 5-fluoro-2-methyl-ind-2-ene-1-one-3-acetate

A mixture of 5-fluoro-2-methyl-indone-1,3-dione (0.3 mole), diethylmalonate (0.25 mole) and anhydrous potassium tert-butoxide (0.6 mole) in t-BuOH (400 ml.) are stirred together under nitrogen at room temperature for 2 hours and then at reflux for 6 hours. The reaction mixture is then acidified with 2.5 N hydrochloric acid and heated and stirred at reflux for a further 3 hours or until the evolution of carbon monoxide has stopped.

The organic material is extracted into ethyl acetate (3 × 200 ml.), washed with water, separated and dried (MgSO$_4$). The solution is filtered, evaporated to dryness and the residue refluxed in methanol (200 ml.) with some concentrated sulfuric acid (0.5 ml.) for 2 hours. The methanol is evaporated to 1/10 volume and the ester extracted into ethylacetate (100 ml.) from saturated sodium bicarbonate (2 × 50 ml.). The organic layer is dried (MgSO$_4$), filtered and the filtrate evaporated to dryness to give methyl-5-fluoro-2-methyl-ind-2-ene-1-one-3-acetate.

F. p-Methylsulfinylbenzylbromide

N-bromosuccinimide (0.1 mole) is added to a solution of p-methylthiotoluene (0.1 mole) in carbon tetrachloride (200 ml.) and the solution is refluxed for 2 hours. The reaction mixture is filtered, evaporated to dryness and put on a column of SiO$_2$ (18 in. × 1 in.). Elution with mixtures of n-hexane-ether gives fractions which contain pure p-methylthiobenzyl bromide as an oil.

The above compound (0.1 mole) is oxidized at room temperature in acetone-water (10:1, 200 ml.) with sodium metaperiodate (0.4 mole). The reaction being followed by t.l.c. in n-hexane to prevent over oxidation.

The product is isolated by evaporating to 1/3 volume and washing this reaction product in ether (100 ml.) well with water. The ether layer is dried (MgSO$_4$), filtered and evaporated to give the solid p-methylsulfinylbenzylbromide.

Molecular bromine under light can be used in place of N-bromosuccinimide in the first part.

The oxidation can be done using aqueous hydrogen peroxide (cold), hypohalide solution, ruthenium tetroxide, peracetic and perbenzoic acids.

G. Methyl 5-fluoro-2-methyl-1-(p-methylsulfinylbenzylidene)-indenyl-3-acetate

Methyl 5-fluoro-2-methyl-ind-2-ene-1-one-3-acetate (0.1 mole) obtained in E is stirred at 10° in benzene (300 ml.) under nitrogen while a Grignard reagent made from p-methylsulfinylbenzyl bromide (0.15 mole) and magnesium (0.2 g. atom) in THF (100 ml.) is added over 30 minutes. The solution is then stirred at room temperature for 18 hours, washed well with saturated ammonium chloride solution (200 ml.) and the benzene layer separated. The benzene solution is dried (MgSO$_4$), filtered and phosphorous pentoxide (5 gm.) added to the solution. The solution is stirred and refluxed for 2 hours and then filtered. The benzene solution is washed well with saturated sodium bicarbonate solution (2 × 50 ml.), water (1 × 50 ml.), dried (MgSO$_4$) and filtered. The benzene layer is evaporated to dryness to give methyl 5-fluoro-2-methyl-1-(p-methylsulfinylbenzylidene)-indenyl-3-acetate.

H. 5-Fluoro-2-methyl-1-(p-methylsulfinylbenzylidene)-indenyl-3-acetic acid

The ester (0.1 mole) is dissolved in 1N aqueous alcoholic sodium hydroxide (3:1, 100 ml.) and stirred at room temperature for 2 hours under nitrogen. The alcohol is evaporated off at 20° and with cooling and rapid stirring, the alkaline aqueous solution is made acid with 1N hydrochloric acid. The solid product is filtered off and dried of phosphorous pentoxide at 20°. It can be recrystallized from mixtures of ethyl acetate n-hexane.

I. Methyl 5-fluoro-2-methyl-1-(p-methylsulfinylbenzylidene)-indenyl-3-acetate

The benzyl bromide (0.1 mole) from Example 1F is mixed with triphenyl phosphine (0.1 mole) in tetrahydrofuran (20 ml.) in a sealed tube and left at room temperature for 2 days. p-Methylsulfinylbenzyl triphenyl phosphine bromide is filtered off.

To the above phosphine bromide (0.05 ml.) in liquid ammonia (50 ml.) is slowly added with stirring at −80° freshly made sodamide (0.05 ml.) and benzene (50 ml.) is added and the liquid ammonia is allowed to boil away. The sodium bromide is filtered off and the salt-free solution is added at room temperature to a stirred solution of the 5-fluoro ketone from Example 1E (0.045 ml.) in dimethoxy ethane (60 ml.) over 20 minutes. The ppt. triphenyl phosphine oxide is filtered off and the evaporated filtrate chromatographed on a column of silica-gel (2 ft. × 1.5 in.) using solution of chloroformethanol to separate the cis-benzylidene compound from any trans-benzylidene compound. In this way, cis-methyl-5-fluoro-2-methyl-1-(p-methylsulfinylbenzylidene)-indenyl-5-acetate is made.

Similarly, the ester from 1I is hydrolyzed in accordance with the procedure of 1H.

What is claimed is:

1. A process for preparing 5-fluoro-2-methyl-1-(p-methylsulfinylbenzylidene)-3-indenyl acetic acid which comprises the steps of:
   a. reacting 5-fluoro-2-methyl-indane-1,3-dione with a malonic acid ester in the presence of a strong base to form an arylidene malonic acid diester and hydrolyzing said diester to form the diacid;
   b. decarboxylating said arylidene malonic acid diacid to form 5-fluoro-2-methyl-ind-2-ene-1-one-3-acetic acid by heating;
   c. esterifying said 3-acetic acid to form the corresponding 3-acetate compound;
   d. reacting said 3-acetate with a p-methylsulfinylbenzyl magnesium halide followed by dehydration using an acid or with a p-methylsulfinylbenzylidenetriphenylphosphorane to form an ester of 5-fluoro-2-methyl-1-(p-methylsulfinylbenzylidene)-indenyl-3-acetate; and
   e. hydrolyzing said indenyl-3-acetate to form the desired product.

2. The process of claim 1 wherein Step (a) is carried out with diethylmalonate at a temperature of from 60°–80°; Step (b) is carried out in the presence of dilute hydrochloric acid at a temperature of 100°–120°; and Step (e) is carried out with a base.

3. The process of claim 1 wherein Step (d) is carried out with p-methylsulfinylbenzyl magnesium chloride, at a temperature of 20°–30°, and Step (e) is carried out with an aqueous alkali hydroxide at or about room temperature.

4. The process of claim 1 wherein Step (d) is carried out with p-methylsulfinylbenzylidene triphenylphosphorane, at a temperature of from 0°–10°, and Step (e) is carried out with an aqueous alkali hydroxide at or about room temperature.

* * * * *